Aug. 30, 1966　　　　W. E. FOLEY　　　　3,270,196
ILLUMINATING DEVICE

Filed Dec. 9, 1963　　　　　　　　　　2 Sheets-Sheet 1

INVENTOR.
WILLIAM E. FOLEY
BY
*Bean, Brooks, Buckley & Bean*
ATTORNEYS

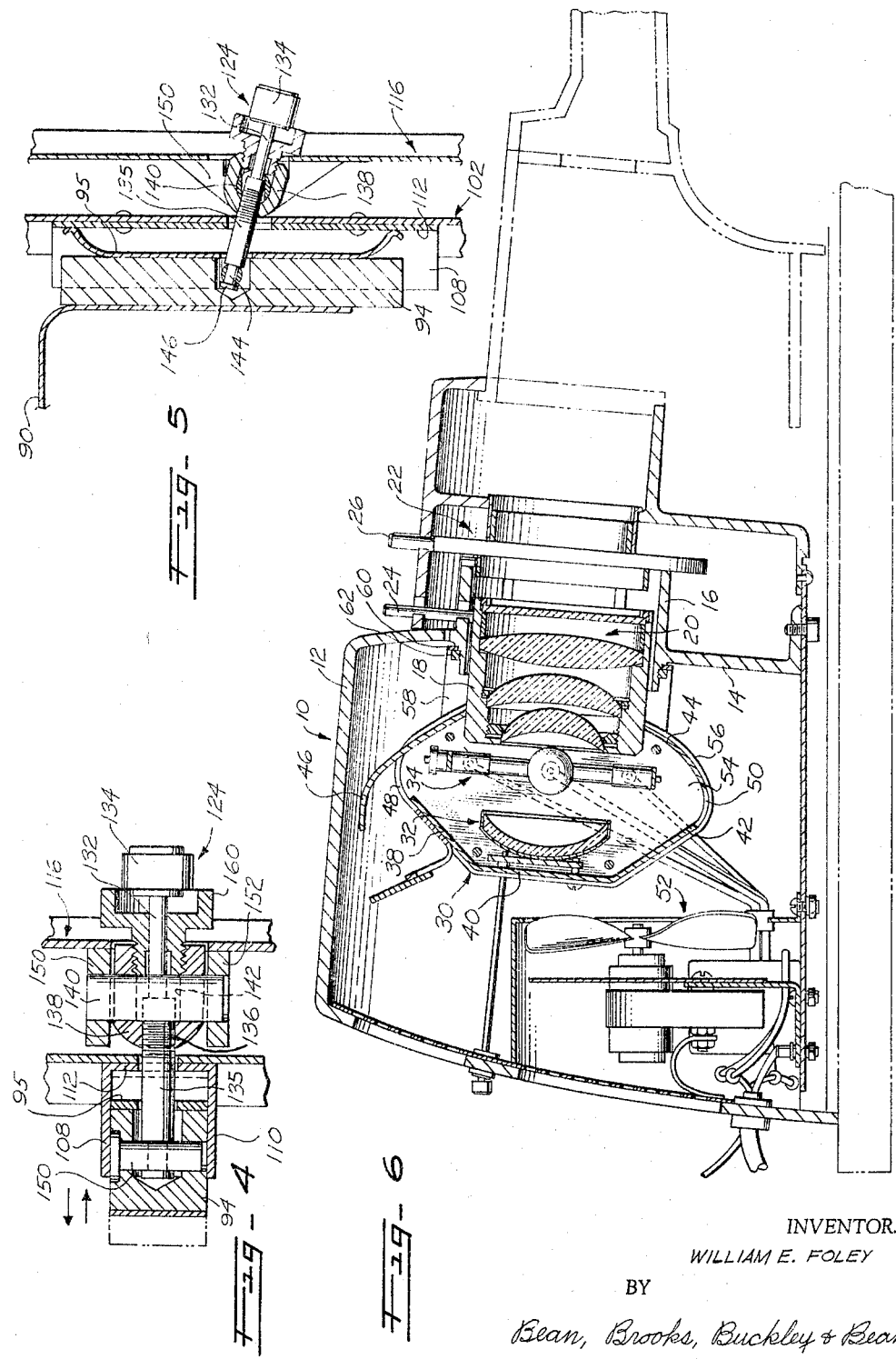

United States Patent Office 3,270,196
Patented August 30, 1966

3,270,196
ILLUMINATING DEVICE
William E. Foley, Buffalo, N.Y., assignor to American Optical Company, Southbridge, Mass.
Filed Dec. 9, 1963, Ser. No. 329,157
3 Claims. (Cl. 240—44.2)

This invention relates to illuminating devices and, in particular, is directed to the improvement of certain details of the internal construction thereof.

In illuminators utilizing light sources which emanate a substantial degree of heat, as for example in fluorescent illuminator systems, some danger to the operator is involved since such light sources may give rise to explosions. Further, it is frequently desirable to provide some means for accurately positioning the light source. It is, therefore, of primary concern in connection with the present invention to provide a novel means for mounting a light source wherein the light source can be accurately adjusted or positioned and wherein the light source is safely housed within the mounting mechanism for most efficient and safe operation.

More particularly, it is an object of this invention to provide a secondary housing mechanism for a light source of an illuminator means wherein one side wall of such secondary housing is removable and wherein such side wall carries means for permitting positioning, both vertically and laterally, of the light source.

More particularly, it is an object of this invention to provide an assemblage as aforesaid wherein the removable side wall member is carried by a closure plate member associated with the outer or primary housing of the illuminating means.

Other objects and advantages of the invention will appear from the description hereinbelow and the accompanying drawing wherein:

FIG. 4 is an enlarged section taken substantially along the plane of section line 4—4 in FIG. 3 showing details of the adjustment mechanism;

FIG. 5 is an enlarged vertical section taken through the adjustment means shown in FIG. 4; and FIG. 6 is a vertical longitudinal section taken substantially along the plane of section line 6—6 in FIG. 2.

Figure 1:
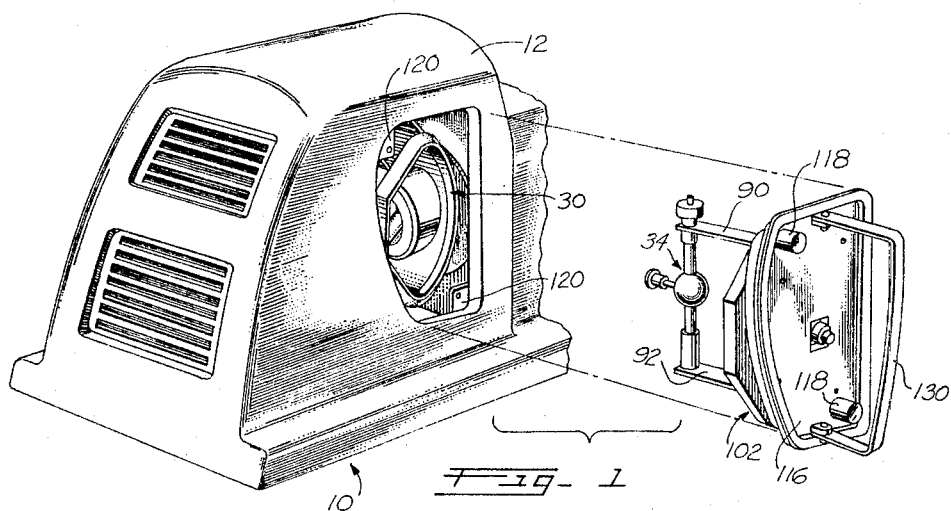
FIG. 1 is a perspective view showing a portion of the illuminator means according to the present invention and illustrating the mechanism for holding the light source removed therefrom.

Referring at this time more particularly to FIG. 6 wherein an exemplary embodiment of an illuminator means constructed according to this invention is shown in longitudinal section, it will be seen that such embodiment consists essentially of a frame or body 10 including the main housing portion 12 which is provided with a front wall 14 including the sleeve portion 16 integral therewith. The sleeve portion 16 slidably mounts a barrel 18 which houses the lens elements of the condenser assembly indicated generally by the reference character 20. Mounted ahead of the condenser assembly is an iris diaphragm assembly indicated generally by the reference character 22 and the condenser assembly and iris diaphragm assembly respectively are provided with adjustment members 24 and 26. The adjustment member 24 effects longitudinal sliding adjustment of the condenser assembly within the sleeve 16 and the member 26 effects a greater or lesser opening of the iris diaphragm assembly 22, as will be readily appreciated by those skilled in the art. The body 10 is provided with a forward extension part of which is shown in dotted lines in FIG. 6 and which includes a nose portion provided with a mirror or suitable reflector for directing the light vertically upwardly through the stage of an associated microscope mechanism not shown. Thus, the specific embodiment shown is directed particularly to an illuminator for microscope.

Mounted within the main housing portion 12 is a secondary housing assemblage indicated generally by the reference character 30 and, in turn, mounted within this secondary housing 30 is a suitable reflector 32 and a light source indicated generally by the reference character 34. It will be appreciated that in order to effect the most efficient illumination, the light source 34 is preferably vertically as well as laterally adjustable relative to the diaphragm assembly 22 and, preferably, is positionable so that the filament of the light source is coincident with the optical axis of the lens system 20.

Figures 2, 3:
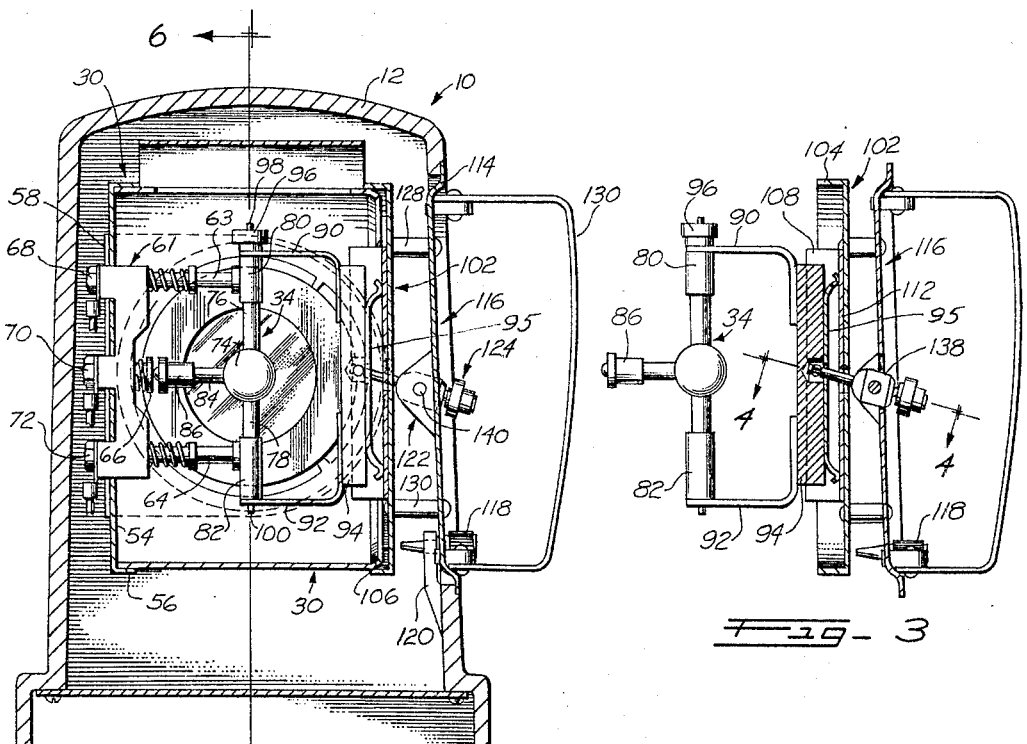
FIG. 2 is an enlarged vertical transverse section taken through the illuminator of FIG. 1 showing the parts in assembled position.
FIG. 3 is a vertical section taken through the mounting means for the light source.

As can be seen in FIGS. 2 and 6, the secondary housing 30 includes a main body portion which may be conveniently constructed from a single sheet of material bent in the shape generally shown in FIG. 6 to include the upper wall portion 38, the rear wall portion 40, the bottom wall portion 42, and the front wall portion 44, which latter wall portion terminates at its upper edge in an overhanging deflector portion 46. The top and bottom wall portions are provided with openings 48 and 50 respectively cooperative with a fan assembly indicated generally by the reference character 52 for the purpose of cooling the light source and maintain the same at proper operating temperature.

As can be best seen in FIG. 2, the main body portion as aforesaid is provided with a fixed side wall member 54 which is provided with a peripherally extending flange 56 which receives the side edge of the main body portion as shown and which is rigidly affixed thereto by any suitable means such as spot welding or the like. An L-shaped bracket including the longitudinally extending leg portion 58 and the transversely extending leg portion 60, see particularly FIG. 6, is utilized to secure the main body portion of the secondary housing 30 and its associated fixed side wall 54 rigidly within the confines of the main housing portion 12 and, for this purpose, it will be appreciated that the transversely extending leg portion 60 of such bracket is provided with an opening receiving the portion of sleeve 16 which projects into the housing 12 as is illustrated in FIG. 6 and a suitable fastening nut 62 is provided to lock this bracket in place substantially as is shown. The longitudinally extending leg portion 58 of this bracket overlies the fixed side wall member 54 and is rigidly affixed thereto as can be seen most clearly in FIG. 2. The side wall 54 carries a contact assembly indicated generally by the reference character 61 and which includes the spring pressed contacts 63 and 64 which are similarly constructed and the additional spring contact member 66, all as shown in FIG. 2. The assembly 61 is provided with suitable contact means 68, 70 and 72 for connecting conductors to the several contacts as aforesaid. It will be appreciated that the light source as is indicated generally by the reference character 34 includes an envelope portion 74 having diametrically opposed leg portions 76 and 78 provided with contact members 80 and 82 and that the envelope portion 74 is provided with a laterally extending leg portion 84 having a contact portion 86, the several contact portions 80, 82 and 86 cooperating with the several spring contacts mentioned in conjunction with the assembly 61. The light source is carried between the lateral arms 90 and 92 of a mounting assembly which includes the guide block member 94 to which the two arm members 90 and 92 are secured. The upper contact 80 of the light source is provided with a nut member 96 threaded on an associated mounting pin 98 and the lower contact 82 is provided with a further pin 100, the two pins 98 and 100 being received in bifurcations at the ends of the arms 90 and 92 and the nut member 96 serving to affix the entire light source assembly 34 to such arms.

The secondary housing assembly 30 is open at that side thereof opposite the fixed side wall member 54 and a removable side wall assembly indicated generally by the reference character 102 is associated therewith and, when disposed in operative position relative to the secondary housing 30, closes this associated side of the housing. The removable side wall 102 is shown more clearly in FIG. 3 and will be seen to include a peripheral flange portion 104 which is adapted to receive the corresponding edge portion 106 of the main body of the housing 30 substantially as is shown in FIG. 2. Additionally, the removable side wall assembly 102 is provided on the inner face thereof with a U-shaped guide channel member which includes the outstanding guide leg portions 108 and 110 which are joined by the bight portion 112, see particularly FIGS. 3 and 4. The guide or carrier block 94 is vertically and laterally slidable within the guide channel member and, more specifically, in slide fitted relationship between the leg members 108 and 110 thereof. The spring 95 is movable with the block 94 and serves to normally bias the block outwardly relative to guide channel.

The housing portion 12 of the body 10 is provided with an opening 114 which is aligned with the opening in the secondary housing 30 with which the removable side wall 102 is associated and this opening 114 is normally closed by a cover plate assembly indicated generally by the reference character 116. For this purpose, the cover plate assembly 116 may include a plurality of retaining bolt members 118 screwthreadedly engageable with suitable bracket nut members 120, see particularly FIG. 2 when the cover plate is operationally positioned relative to the opening 114. The inner side of the cover plate 116 is provided with a pivot assembly indicated generally by the reference character 122 which has associated therewith adjustment means indicated generally by the reference character 124 which is operatively connected with the carrier block member 94 and is adapted to impart both vertical and lateral adjustment thereof as will be seen hereinafter. Further, the removable side wall member 102 is fixedly secured in inwardly spaced relationship to the cover plate member 116 by a series of spacers such as those indicated by reference characters 128 and 130 in FIG. 2, the net result being that the cover plate assembly 116, the removable side wall 102 and the light source 34 are removable as a unit from the housing 12 as will be evidenced from FIGS. 1 and 3. Thus, when it is desired to change the light source for any purpose whatsoever, the member 118 is disengaged from the bracket 120 and the handle portion 130 of the cover plate grasps to remove the assembly from the body 10 in the manner illustrated in FIG. 1. Then, by manipulating the nut member 96 to loosen the same, the light source 34 may be removed and a new one introduced between the arms 90 and 92 as will be readily appreciated.

When the cover plate assembly 116 is repositioned relative to the body 10 and, more particularly, in covering relationship to the opening 114 in the housing portion 12 thereof, it will be manifest that some adjustment of the light source 34 will be required to center the filament thereof or its equivalent coincident with the optical axis of the condenser lens assembly 20 illustrated in FIG. 6. To this end, the adjustment mechanism 124, as will be seen most clearly in FIGS. 4 and 5, includes a shaft member 132 having a knob 134 at its outer end and having an enlarged inner end portion 135 threaded as indicated by reference character 136. The threaded portion 136 engages in a hollow nut member 138 which is provided with a transverse bore receiving the pivot pin member 140.

The pivot pin 140 is bored as at 142 as shown in FIG. 4 and as will be clearly evident from FIG. 5, to provide diagonal clearance for the enlarged portion 135 of the shaft 132. The inner end of the shaft is provided with a further reduced end portion 144, leaving an enlarged head 146 at the inner extremity thereof and a slotted pin member 150 carried by the carrier block 94 serves to pivotally connect the inner end of the shaft to such carrier block 94 as will be readily apparent. The aforesaid hollow nut member 138 is pivotally mounted between the bracket ears 150 and 152 which are fixed to the inner face of the cover plate assembly 116 so that the entire adjustment assembly 124 is pivotable about the horizontal, longitudinally extending axis established by the pin member 140, which will impart corresponding vertical adjustment of the light source 34 and to some degree lateral motion thereof due to the arcuate path described by the inner end of the shaft 132. However, to obtain control of the lateral adjustment of the carrier block 94 and consequently of the light source 34, the shaft 132 may simply be rotated counterclockwise or clockwise as the case may be to feed the carrier block 94 in and out laterally to the desired adjusted position and, of course, up or down motion on the knob 134 will impart the requisite vertical motion to the light source as mounted on the carrier block assembly 94. For the purpose of locking the assembly in adjusted position, a jam knob 160 is provided which is threadably engaged within the nut member 138 and is adapted to forcefully engage against the pin 140 as will be evident from FIGS. 4 and 5.

It is to be understood that certain changes and modifications as illustrated and described may be made without departing from the spirit of the invention or the scope of the following claims.

What is claimed is:

1. In an illuminator including a housing and an optical system associated therewith,
    a light source housing within the first housing and having an opening receiving a portion of said optical system,
    said light source housing and said first housing having aligned open wall portions and a cover member for each such open wall portion,
    said cover members being rigidly interconnected and there being means for detachably securing that cover member associated with said first housing to such first housing whereby both cover members are operatively positioned thereby,
    the other cover member having a guide member on its inner face,
    a carrier member vertically and laterally positionable in said guide member,
    a light source fixed to said carrier member,
    and means carried by the cover member associated with said first housing and connected to said carrier member for imparting vertical and lateral adjustments thereto.

2. The illuminator according to claim 1 wherein said carrier member is in the form of an elongate block having securing arms projecting therefrom, and said light source being removably carried between said securing arms.

3. In an illuminator,
    an illuminator body having a housing portion and an optical condenser,
    a secondary housing disposed within said housing portion and communicating with said optical condenser,
    said secondary housing having a fixed side wall and a removable side wall,
    electrical contact means carried by said fixed side wall,
    a light source carried by said removable side wall and engageable with said electrical contact means when the removable side wall is operatively positioned with respect to said secondary housing, said housing portion having an opening through which said removable side wall may be passed, a cover plate removably attached to said housing portion for covering the opening therein, means joining said cover plate and said removable side wall whereby the two are simultaneously operatively positioned, and means carried by said cover plate for adjusting said light source relative to said optical condenser.

References Cited by the Examiner

UNITED STATES PATENTS

| | | | |
|---|---|---|---|
| 1,138,848 | 5/1915 | Dake | 246—44.2 |
| 1,472,894 | 11/1923 | Vallee et al. | 240—44.2 |
| 1,879,650 | 9/1932 | Wollensak et al. | 240—44.2 |
| 1,890,167 | 12/1932 | Sheely | 240—42.2 X |

NORTON ANSHER, *Primary Examiner.*

C. C. LOGAN, *Assistant Examiner.*